US012671724B2

(12) United States Patent
Yang

(10) Patent No.: US 12,671,724 B2
(45) Date of Patent: Jun. 30, 2026

(54) VOICE CALL METHOD AND USER EQUIPMENT

(71) Applicant: VIVO MOBILE COMMUNICATION CO., LTD., Dongguan (CN)

(72) Inventor: Dengpin Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 284 days.

(21) Appl. No.: 18/517,641

(22) Filed: Nov. 22, 2023

(65) Prior Publication Data

US 2024/0089304 A1 Mar. 14, 2024

Related U.S. Application Data

(63) Continuation of application No. PCT/CN2022/096838, filed on Jun. 2, 2022.

(30) Foreign Application Priority Data

Jun. 7, 2021 (CN) .......................... 202110632685.1

(51) Int. Cl.
H04L 65/1073 (2022.01)
H04L 65/1016 (2022.01)
H04W 60/04 (2009.01)

(52) U.S. Cl.
CPC ...... *H04L 65/1073* (2013.01); *H04L 65/1016* (2013.01); *H04W 60/04* (2013.01)

(58) Field of Classification Search
CPC ............. H04L 65/1073; H04L 65/1016; H04L 65/1069; H04W 60/04; H04W 36/00224; H04W 48/18; H04W 48/08; H04W 60/00
See application file for complete search history.

(56) References Cited

U.S. PATENT DOCUMENTS

| | | | |
|---|---|---|---|
| 10,939,345 B2 | 3/2021 | Chong et al. | |
| 11,343,287 B2 * | 5/2022 | Lee | ...................... H04L 65/1095 |
| 12,284,625 B2 * | 4/2025 | Lee | ......................... H04W 8/183 |

(Continued)

FOREIGN PATENT DOCUMENTS

| | | |
|---|---|---|
| CN | 110945903 A | 3/2020 |
| CN | 111107058 A | 5/2020 |

(Continued)

*Primary Examiner* — Kenneth T Lam
(74) *Attorney, Agent, or Firm* — The Webb Law Firm

(57) ABSTRACT

A voice call method includes in a case that UE accesses a first network, receiving a registration reception message sent by a first network side device corresponding to a first network; based on the registration reception message, in a case that a predetermined condition is met, stopping using the first network and connecting to a second network; and sending a voice call request to a second network side device corresponding to the second network. The voice call request is used to request the second network side device to process a voice call service. The predetermined condition includes that the registration accept message carries a first identifier indicating that the UE does not support an IMS service; or the registration accept message carries a second identifier indicating that the UE supports an IMS service, and the UE confirms that registration of the IMS service to the first network side device fails.

12 Claims, 6 Drawing Sheets

(56)     References Cited

U.S. PATENT DOCUMENTS

| | | | |
|---|---|---|---|
| 2015/0365851 A1* | 12/2015 | Wang .................... | H04M 15/57 |
| | | | 455/439 |
| 2016/0353344 A1 | 12/2016 | Deivasigamani et al. | |
| 2018/0213586 A1* | 7/2018 | Chong ................. | H04W 72/56 |
| 2018/0263066 A1* | 9/2018 | Chiang .............. | H04L 65/1016 |
| 2020/0053134 A1 | 2/2020 | Niemi et al. | |
| 2020/0100309 A1 | 3/2020 | Jha et al. | |
| 2021/0022197 A1* | 1/2021 | Chiang .............. | H04L 65/1104 |
| 2021/0029593 A1* | 1/2021 | Tsai ................ | H04W 36/00226 |
| 2021/0068067 A1* | 3/2021 | Natarajan .......... | H04W 60/005 |
| 2021/0127314 A1 | 4/2021 | Mukherjee et al. | |
| 2023/0007054 A1* | 1/2023 | Huang ............... | H04L 65/1073 |
| 2023/0086087 A1 | 3/2023 | Shen et al. | |
| 2023/0262099 A1* | 8/2023 | Yang .................. | H04L 65/1073 |
| | | | 370/331 |

FOREIGN PATENT DOCUMENTS

| | | | |
|---|---|---|---|
| CN | 111372327 A | 7/2020 | |
| CN | 111567068 A | 8/2020 | |
| CN | 112369079 A | 2/2021 | |
| CN | 113543281 A | 10/2021 | |
| WO | 2021104054 A1 | 6/2021 | |

* cited by examiner

600

700

VOICE CALL METHOD AND USER EQUIPMENT

CROSS-REFERENCE TO RELATED APPLICATIONS

This application is a Bypass Continuation Application of International Patent Application No. PCT/CN2022/096838 filed Jun. 2, 2022, and claims priority to Chinese Patent Application No. 202110632685.1 filed Jun. 7, 2021, the disclosures of which are hereby incorporated by reference in their entireties.

BACKGROUND OF THE INVENTION

Field of the Invention

The present application belongs to the technical field of communication, and in particular relates to a voice call method, user equipment, and a non-transitory readable storage medium.

Description of Related Art

With the popularization and development of 5G technology, more and more users start to use 5G standalone (SA) networks. Since voice over new radio (VoNR, a voice call solution based on 5G access) has not been commercialized at present, a voice service under the 5G SA network falls back to the long term evolution (LTE) network and voice call services are processed through the voice call solution under the LTE network.

SUMMARY OF THE INVENTION

According to a first aspect, the embodiment of the present application provides a voice call method, the method including:

in a case that user equipment UE accesses a first network, receiving, by the UE, a registration accept message sent by a first network side device corresponding to a first network;

based on the registration accept message, in a case that a predetermined condition is met, stopping, by the UE, using the first network and connecting to a second network; and sending, by the UE, a voice call request to a second network side device corresponding to the second network, where the voice call request is used to request the second network side device to process a voice call service;

where the predetermined condition includes any one of the following:

that the registration accept message carries a first identifier used to indicate that the UE does not support an IMS service; and that the registration accept message carries a second identifier used to indicate that the UE supports an IMS service, and the UE confirms that registration of the IMS service to the first network side device fails.

According to a second aspect, the embodiment of the present application provides a voice call apparatus, which includes:

a first receiving module, configured to: in a case that user equipment UE accesses a first network, receive a registration accept message sent by a first network side device corresponding to a first network;

a connection module, configured to: in a case that a predetermined condition is met, stop using the first network and connect to a second network; and a first sending module, configured to send a voice call request to a second network side device corresponding to the second network, where the voice call request is used to request the second network side device to process a voice call service;

where the predetermined condition includes any one of the following:

that the registration accept message carries a first identifier used to indicate that the UE does not support an IMS service; and that the registration accept message carries a second identifier used to indicate that the UE supports an IMS service, and the UE confirms that registration of the IMS service to the first network side device fails.

According to a third aspect, the embodiment of the present application provides user equipment, where the user equipment includes a processor, a memory, and a program or an instruction stored in the memory and executable on the processor, and when the program or the instruction is executed by the processor, steps of the method according to the first aspect are implemented.

According to a fourth aspect, the embodiment of the present application provides a non-transitory readable storage medium. The non-transitory readable storage medium stores a program or an instruction, and when the program or the instruction is executed by a processor, the steps of the method in the first aspect are implemented.

According to a fifth aspect, the embodiments of the present application provide a chip, where the chip includes a processor and a communications interface, the communications interface is coupled to the processor, and the processor is configured to run a program or an instruction, to implement the method according to the first aspect.

DESCRIPTION OF THE INVENTION

Figures 1, 2:
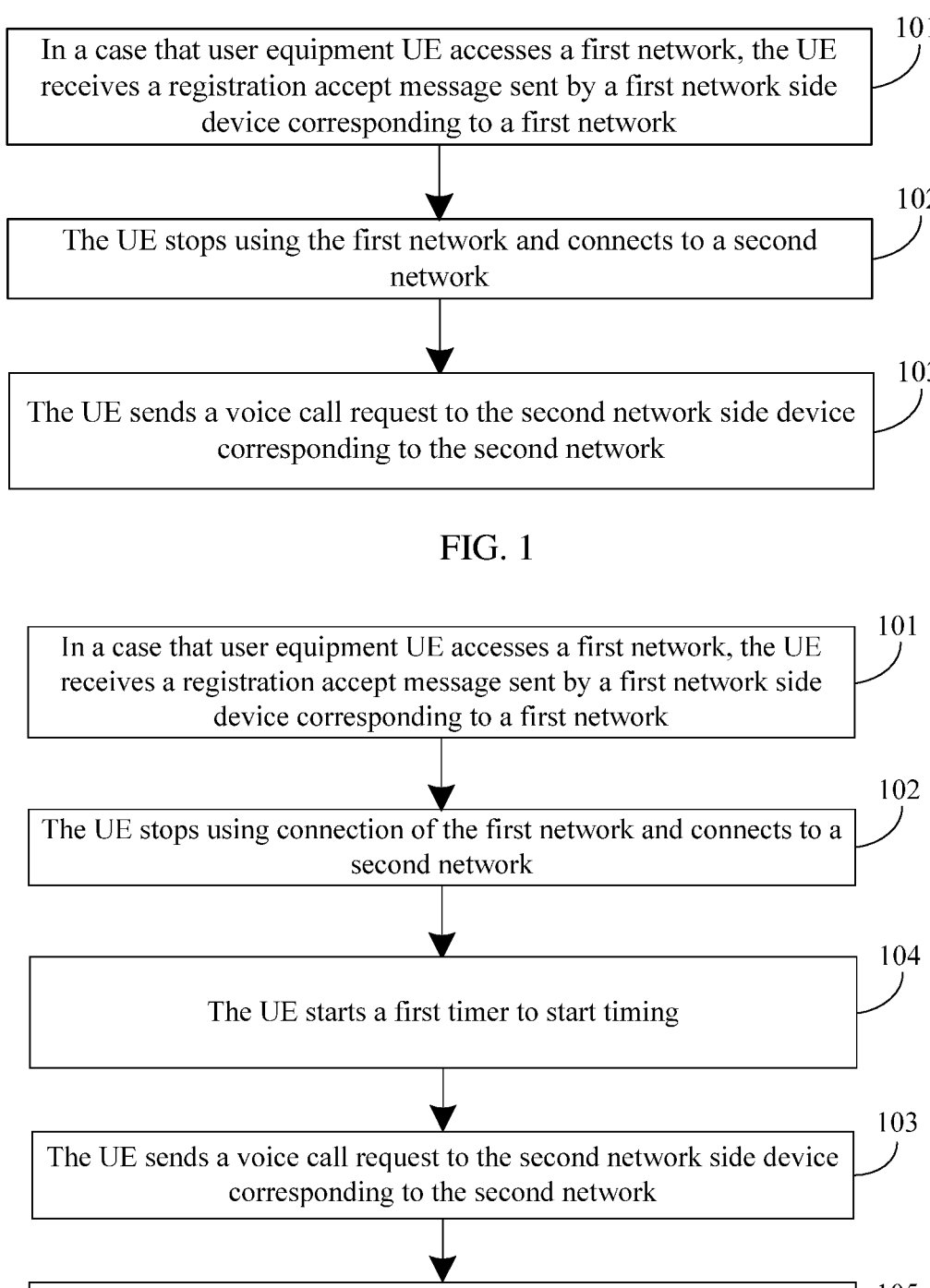
FIG. 1 is a schematic flowchart of a voice call method according to an embodiment of the present application.
FIG. 2 is a schematic flowchart 1 of application of a voice call method according to an embodiment of the present application.

The following clearly describes technical solutions in embodiments of the present application with reference to accompanying drawings in the embodiments of the present application. Apparently, the described embodiments are some but not all of the embodiments of the present application. All other embodiments obtained by a person of ordinary skill in the art based on the embodiments of the present application shall fall within the protection scope of the present application.

The terms "first", "second", and the like in this specification and claims of the present application are used to distinguish between similar objects instead of describing a specific order or sequence. It should be understood that data used in such a way are interchangeable in proper circumstances, so that the embodiments of the present application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "/" generally represents an "or" relationship between associated objects.

The nouns involved in the embodiments of the present application are explained below.

EPS fallback: a solution for falling back from a 5G network to a 4G network in the early stage of 5G network construction.

VoNR: a call solution based on 5G access, enabling both voice services and data services to be carried by the 5G network.

Circuit switched fallback (CSFB): circuit switch fallback technology, that is, user equipment camps on an LTE network for packet switch (PS) services, and then falls back to a CS domain of a 2G/3G network for a voice service when it needs to complete the voice call service.

Before introducing the voice call method provided by the embodiment of the present application, a communication system involved in the embodiment of the present application is first introduced. The communication system may include: UE, a first network, an IMS network, and a second network. The first network and the second network can be both connected to the IMS network.

The UE stores user information, and a user information may be stored in a subscriber identity module (SIM) card of the UE. The UE can use a user information as an identifier to make voice calls with other user equipment through various voice call solutions.

The IMS network is used to manage packaged IP data packets of multimedia data such as voice and video, distinguish signaling data and multimedia data of these IP data packets, and transmit the multimedia in IP data packets between the UE and other user equipment called by the UE, thereby providing a voice call service for the UE.

The first network may be an independent networking deployment mode of the 5G network, and the first network side device on the first network side forms a communication link with the UE through a new radio (NR) technology. It should be noted that since the first network is connected to the IMS network, the first network side device can package the multimedia data in the call voice service initiated by the UE into an IP data packet, and transmit it to other user equipment through the IMS network.

The second network may be a long term evolution network, and the second network side device of the second network may form a communication link with the UE through an LTE link. It can be understood that, since the second network is connected to the IMS network, the second network side device can package the multimedia data in the call voice service initiated by the UE into IP data and transmit it to other user equipments through the IMS network.

The voice call method provided by the embodiment of the present application will be described in detail below through embodiments and application scenarios with reference to the accompanying drawings.

At present, although the voice call service available on the 5G SA network can be performed by falling back to the LTE network, voice call services still need to be provided based on the internet protocol multimedia subsystem (IMS). However, the current 5G SA network is still in the construction stage, IMS service registration failures still exist in many usage scenarios, which leads to the failure of voice call services under the 5G SA network.

As shown in FIG. 1, the embodiment of the present application provides a voice call method. The method may include the following step 101 to step 103.

Step 101: In a case that UE accesses a first network, the UE receives a registration accept message sent by a first network side device corresponding to a first network.

Exemplarily, in the embodiment of the present application, the first network may be a 5G SA network, and the first network side device is a network side device (for example, a 5G base station) of the 5G SA network.

Optionally, the UE may send a registration request to the first network side device of the first network, where the registration request carries capability information, registration information, and the like of the UE. The first network side device can authenticate the UE according to the capability information and registration information of the UE carried in the registration request. After the first network side device succeeds in authenticating the UE, the first network side device can send a registration accept message to the UE, where the message can carry information such as an identifier indicating whether a user equipment supports IMS services.

It can be understood that after the first network side device succeeds in authenticating, a communication link may be formed between the UE and the first network side device through the NR link.

Step 102: Based on the registration accept message, in a case that a predetermined condition is met, the UE stops using the first network and connects to a second network.

The predetermined condition includes any one of the following: that the registration accept message carries a first identifier used to indicate that the UE does not support an IMS service; and that the registration accept message carries a second identifier used to indicate that the UE supports an IMS service, and the UE confirms that registration of the IMS service to the first network side device fails.

Optionally, the registration accept message may carry a first identifier indicating that the UE does not support the IMS service (for example: VoPS carried in the registration accept is Not supported), and the first identifier indicates that the UE does not support the IMS service.

It can be understood that in this case, if the UE needs to initiate a voice call service, since the UE does not support the IMS service, the UE does not initiate the voice call service through the IMS network under the first network.

Optionally, the registration accept message may carry a second identifier indicating that the UE supports the IMS service (for example: VoPS carried in the registration accept is Supported), and the second identifier indicates that the UE supports the IMS service.

It can be understood that, in this case, the UE may initiate an IMS service registration request to the IMS network through the first network, and the IMS service registration request carries a user identification module, user information, and the like. The IMS network authenticates the UE according to a user identification module and user information carried in the IMS service registration request, and sends a registration success message to the UE after the UE passes the authentication, and the UE can use the IMS network for voice call services.

However, under the first network, not all IMS service registration requests sent to the IMS network can pass the authentication. Many reasons (for example: IMS PDU session establishment failure and SIP signaling registration failure) may cause UE to fail to register IMS services. Therefore, after the UE confirms that the registration with the IMS network fails, the UE cannot initiate a voice call service through the IMS network.

Obviously, in the above two cases, the UE cannot initiate a voice call service through the IMS network under the first network. If the UE still needs to make a voice call, the UE can cut off the NR link connected to the first network side device, and establish a connection with the second side network device through an LTE link, to fall back to the second network (4G network).

Step 103: The UE sends a voice call request to the second network side device corresponding to the second network.

The voice call request is used to request the second network side device to process a voice call service.

In the embodiment of the present application, under the first network, when the UE fails to successfully register the IMS service, the UE can fall back to the second network, and meet the voice call demand of the UE through the second network side device. Optionally, the second network side device may include a 4G base station and devices in the EPC.

It should be noted that the second network side device can provide two voice call solutions that can be carried by the second network system, namely, a voice over long term evolution (VoLTE) voice service solution and a CSFB voice service solution. The CSFB voice service solution is that a user equipment first camps on the LTE network, and then falls back to the CS domain of the 2G/3G network when it needs to complete the voice call service. When the UE completes the voice call service on the 2G/3G network, the UE returns to a voice service solution for the LTE network.

In this way, when a user equipment is in the first network, in a case that the UE fails to register with the IMS network or the UE has not activated or the UE does not support the IMS service, the UE can process a user voice call request by requesting other voice solutions under the LTE network, which can ensure that the UE can perform voice calls with other UEs, meet a user call needs, and guarantee a user call experience.

Optionally, referring to FIG. 1, as shown in FIG. 2, the voice call method provided in the embodiment of the present application may further include step 104 before step 103:

Step 104: The UE starts a first timer to start timing.

In the embodiment of the present application, the UE not only needs to process voice call services, but also needs to process other types of communication services. After the UE falls back from the first network to the second network, a user equipment may start a first timer, and the first timer is used to instruct the UE to return to the first network after a certain period of time.

Exemplarily, the first timer can be Return to SA Timer, and the timing duration of the first timer for returning to the first network can be set by a user according to needs, or automatically set by the UE according to factors such as the network environment or the main period in which a user needs to use the first network to process other communication services. Optionally, referring to FIG. 1, as shown in FIG. 2, the voice call method provided in the embodiment of the present application may further include step 105 after step 103:

Step 105: After the first timer expires, the UE stops using the second network and connects to the first network.

In this embodiment of the present application, after the first timer expires, the UE stops using the LTE link of the second network side device, and re-establishes a connection with the first network side device through the NR link, so as to return to the first network.

Exemplarily, the first timer may be turned off after the timing duration ends, and the first timer may also be turned off by the UE during the timing duration.

For example: after the UE performs a restart operation, the UE may turn off the first timer. The UE performs a restart operation generally in the following scenarios: a user performs a hot-swap card operation, a user performs a restart operation, and a user performs a switch from an airplane mode to a data network mode, etc.

It can be understood that after the UE performs the restart operation, the UE directly establishes a communication link with the first network side device according to the agreement with the operator, and the UE no longer needs the first timer to continue timing to return to the first network. Therefore, after the UE restarts, the UE may turn off the first timer.

In this way, after the first timer is turned off, the UE can automatically return to the first network, so that a user can use the UE to process other communication services and improve user experience.

Figure 3:
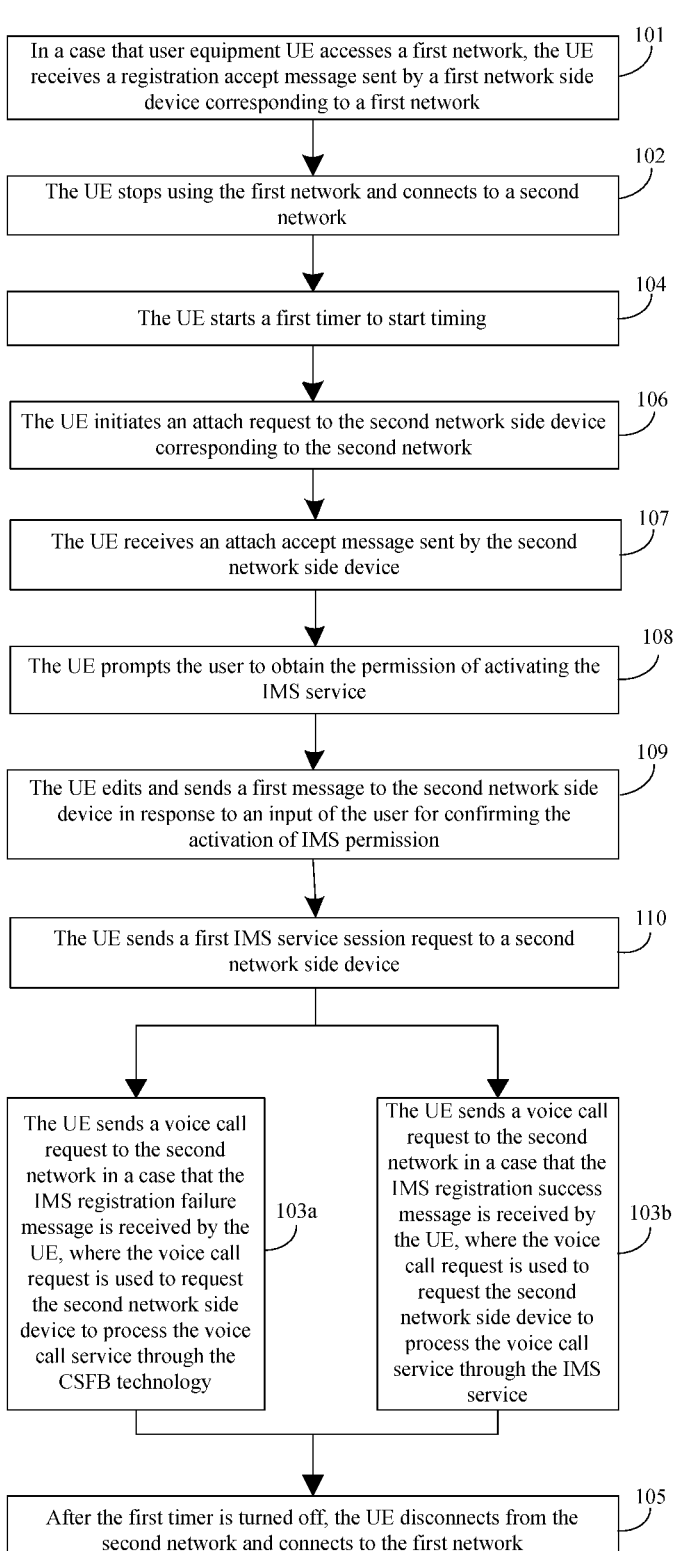
FIG. 3 is a schematic flowchart 2 of application of a voice call method according to an embodiment of the present application.

Optionally, referring to FIG. 2, as shown in FIG. 3, in a case that the predetermined condition is that the registration accept message carries the first identifier for indicating that the UE does not support the IMS service, the voice call method provided in the embodiment of the present application may further include step 106 and step 107 before step 103:

Step 106: The UE sends an attach request to the second network side device corresponding to the second network.

Exemplarily, the UE reports network capability information to the second network side device by sending an attach request to the second network side device, and the network capability information may include capability information for determining whether the UE has activated IMS service permission.

Step 107: The UE receives an attach accept message sent by the second network side device.

Exemplarily, the second network side device returns an attach accept message to the UE, and the attach accept message also carries an identifier (VoPS). The identifier is used to indicate whether the UE has the capability of using the IMS network to perform the voice call service under the second network.

For example, a third identifier (VoPS is Supported) may be carried in the attach accept message, indicating that the UE has the permission and capability of using the IMS network to initiate a voice call request under the second network. In this case, the UE may initiate an IMS service registration request for registering the IMS service to the second network instance device.

For example, the attach accept information may carry a fourth identifier (VoPS is Not supported), indicating that the UE does not have the permission or capability of using the IMS network to initiate a voice call request under the second network. In this case, the UE can send the first IMS service registration request to the second network side device only after activating the IMS service from the second network side device.

Optionally, in the case that the fourth identifier is carried in the attach accept message, the voice call method provided in the embodiment of the present application further includes step 108 and step 109 to activate the permission of the IMS service first:

Step 108: The UE prompts a user to obtain the permission of activating the IMS service.

It can be understood that if the fourth identifier is carried in the attach accept message, it means that the UE does not have the permission or capability of using the IMS network to initiate a voice call request under the second network. The UE needs to obtain the permission of activating the IMS service by sending prompt information to a user.

Figure 4:
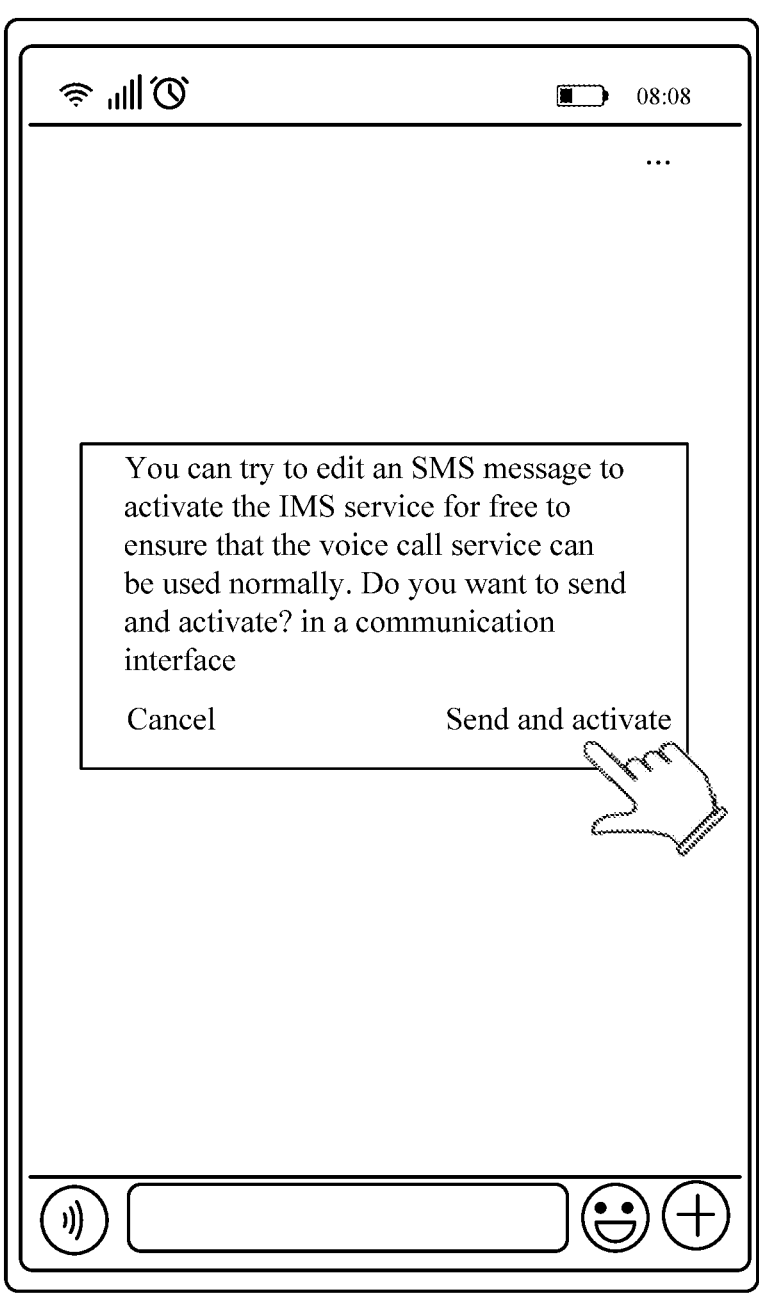
FIG. 4 is a schematic interface diagram of a voice call method according to an embodiment of the present application.

Exemplarily, as shown in FIG. 4, the UE can prompt a user "You can try to edit an SMS message to activate the IMS service for free to ensure that the voice call service can be used normally. Do you want to send and activate?" in a communication interface. A user can determine whether to activate the IMS service through touch input "send and activate" and "cancel".

Step 109: The UE edits and sends a first message to the second network side device in response to an input of a user for confirming the activation of IMS permission, where the first message is used to request the second network side device to activate the IMS service.

Exemplarily, as shown in FIG. 4, when a user inputs on the "send and activate" control on the communication interface, it means that a user agrees to activate the IMS service.

Exemplarily, the UE may automatically pop up a message editing interface in response to the input, so as to edit the first message (for example: an SMS message). Usually, the SMS content and SMS numbers used to activate the IMS service of different operators may be different, and based on categories of operators who have established agreements with a user, the UE can automatically fill in SMS numbers and corresponding SMS messages meeting requirements of the operators.

Correspondingly, after editing the first message, the UE sends the first message to the second network side device, so as to activate the IMS service under the second network.

Optionally, after the UE sends the first message, a user equipment may start a fourth timer (IMS_Subscriplion-_Timer).

It should be noted that the fourth timer is used to prompt the UE to send the first IMS service registration request. Each time the fourth timer expires, the UE may send the first IMS service registration request to the second network side device again, to avoid that the first IMS service registration request is sent unsuccessfully.

Optionally, the timing duration of the fourth timer may be 3 to 5 minutes. The timing duration may also be automatically set by the UE.

In this way, after the UE fails to initiate a voice call request on the first network and falls back to the second network, when the UE does not have the capability or permission to use the IMS network, and thus cannot register the IMS service and complete the call, the UE can obtain user permission and then activate the IMS service through the first message (for example: an SMS message), so as to provide preconditions for a user equipment to subsequently register the IMS service with the second network side device.

As shown in FIG. 3, the voice call method provided in the embodiment of the present application further includes step 110 after step 107:

Step 110: Based on the third identifier carried in the attach accept message, or based on that the UE has activated the IMS service, the UE sends a first IMS service registration request to the second network side device.

The third identifier is used to indicate that the UE supports the IMS service.

In this embodiment of the present application, based on that the UE has activated the IMS service, or based on that the attach accept message sent by the second network side device carries a third identifier indicating that the UE supports the IMS service, the UE sends the first IMS service registration request to the second network side device to register the IMS service.

In this way, only when the UE sends an attach request to the second network side device in the second network, to determine that the UE has the capability of using the IMS network to initiate a voice call service under the second network, the UE sends the first IMS service registration request to the second network side device to register with the IMS network, so as to avoid IMS service registration failure caused by not activating the IMS service.

Optionally, in the voice call method provided in the embodiment of the present application, step 103 may include step 103*a*:

Step 103*a*: In a case that the UE receives an IMS registration failure message, the UE sends a voice call request to the second network.

The voice call request is used to request the second network side device to process the voice call service through the CSFB technology.

It should be noted that the voice call solution VoLTE carried on the second network is still a voice call solution based on the IMS network. Therefore, after the UE fails to register the IMS service with the second network side device, the UE cannot process the voice call service through the VoLTE technology. The UE can only fall back to the CS domain of the 2G/3G network on the second network, and use the CSFB voice service solution to ensure the normal operation of the voice call service.

For example, when the UE is connected to LTE, the CSFB voice service solution can process CS services such as initiating voice call services and receiving voice calls, and can correctly process the ongoing PS services (data services) of the UE in the LTE network.

Optionally, after receiving the IMS registration failure message, the UE may turn off the fourth timer.

It can be understood that the fourth timer is used to prompt the UE to regularly send the first IMS service registration request, so as to prevent that the first IMS service registration request is unsuccessfully sent, or the second network side device does not receive the request. However, after the IMS registration fails, a user equipment does not need to repeatedly and regularly send the IMS service registration request to the second network side device. In this case, the UE may turn off the fourth timer. In this way, even if the UE fails to register the IMS service after the UE falls back to the second network, a user equipment can still process the voice call service through the CSFB technology to ensure the voice call needs of a user.

Optionally, in the voice call method provided in the embodiment of the present application, step 103 may include step 103*b*:

Step 103b: In a case that the UE receives an IMS registration success message, the UE sends a voice call request to the second network.

The voice call request is used to request the second network side device to process the voice call service through the IMS network.

It can be understood that the VoLTE voice call solution carried by the second network is also a voice solution based on the IMS network. After a user equipment successfully registers the IMS service, the voice call service can be processed through the VoLTE voice call solution of the IMS network.

Optionally, after receiving the IMS registration success message, the UE may turn off the fourth timer.

It can be understood that the fourth timer is used to prompt the UE to regularly send the first IMS service registration request, so as to prevent that the first IMS service registration request is unsuccessfully sent, or the second network side device does not receive the request. However, after the IMS registration succeeds, the UE does not need to repeatedly and regularly send the IMS service registration request to the second network side device. In this case, the UE may turn off the fourth timer. In this way, after the UE falls back to the second network, if the UE can successfully register the IMS service, the voice call service can be processed through the VoLTE technology of the voice call solution based on the IMS network, to ensure the voice call needs of a user.

Figure 5:
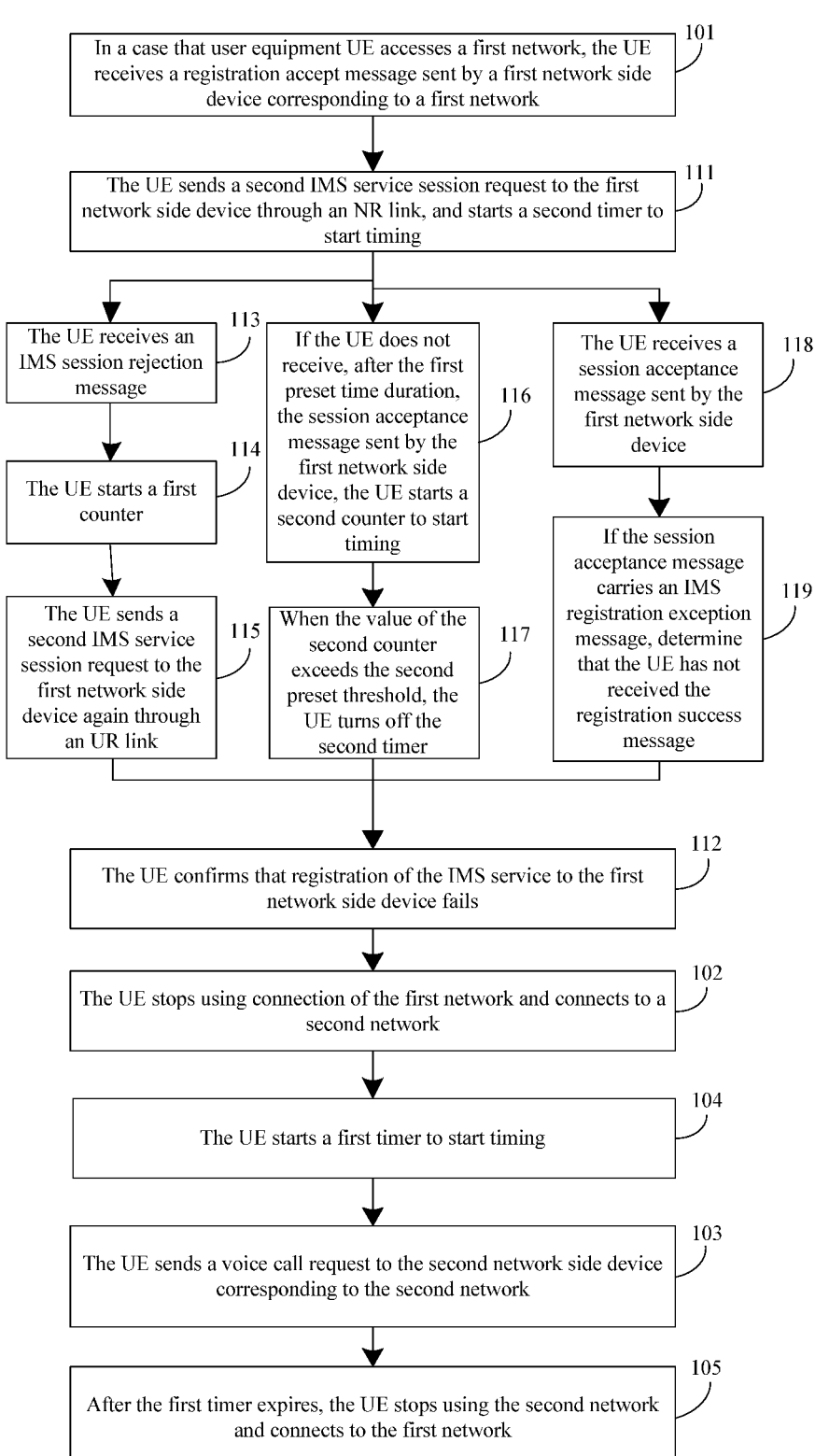
FIG. 5 is a schematic flowchart 3 of application of a voice call method according to an embodiment of the present application.

Optionally, referring to FIG. 2, as shown in FIG. 5, when the predetermined condition is that the registration accept message carries the second identifier for indicating that the UE supports the IMS service, the voice call method provided in the embodiment of the present application may further include step 111 and step 112 before step 102:

Step 111: The UE sends a second IMS service registration request to the first network side device through an NR link, and starts a second timer to start timing.

In this embodiment of the present application, if the UE is under the first network and the registration accept message carries the second identifier indicating that the IMS service is supported, it means that the UE has the permission or capability to register with the IMS network, and the UE can send a second IMS registration service request to the first network side device, where the second IMS registration service request is used to register an IMS service.

It can be understood that based on that the UE has the permission or capability to register with the IMS network, the UE may send the second IMS registration service request to the first network side device through the NR link under the first network, so as to avoid that when the UE has no permission or capability to register with the IMS network, resources are wasted because the UE repeatedly sends requests to the first network side device.

Exemplarily, the second IMS service registration request may be an IMS PDU session, that is, the UE sends a PDU session establishment request to the session management function (SMF) of the first network side device, so as to perform IMS service registration.

Optionally, after the UE sends the second IMS service registration request to the first network side device through the NR link, the UE starts the second timer. The second timer is used to monitor the registration state of the UE.

Optionally, the second timer may be NR_IMS_REG-_Timer, and the timing duration in which the second timer regularly monitors whether the registration status of the UE is successful can be set by a user as required, or automatically set by the UE according to network environment and other factors.

In this way, after the UE sends the second IMS service registration request to the first network side device under the first network, by starting the second timer to monitor whether the UE registers the IMS service successfully, the UE can know in time whether the IMS service can be successfully registered under the first network, so that the UE can determine whether to cut off the connection with the first network side device, so as to fall back to the second network to guarantee normal operation of the voice call service through the voice call solution carried on the second network.

Step 112: Based on that the second timer expires or is turned off, or based on that the UE does not receive the IMS registration success message, the UE confirms that the registration of the IMS service to the first network side device fails.

After the UE sends the second IMS registration service request to the first network side device, many reasons (for example: IMS PDU session establishment failure and SIP signaling registration failure) may cause the UE to fail to register the IMS service.

For example, in this embodiment of the present application, the UE may confirm that registration of the IMS service to the first network side device fails based on the following case occurring under the first network: for example: in the above embodiment provided by the present application, a case in which the UE receives a session rejection message and still fails to register successfully within the duration after which the second timer expires; a case in which the UE still fails to receive the session accept message and turns off the second timer after waiting for n first preset durations; a case in which although the UE has received the session accept message, but the session accept message carries an IMS registration exception message, and the UE confirms that it no longer receives the IMS service registration success message. The above case that the UE fails to register the IMS service will be introduced in detail in the following embodiments, and will not be repeated here to avoid repetition.

In this way, after the UE confirms that the registration of the IMS service under the first network fails, that is, the voice call service cannot be initiated through the IMS network under the first network, the UE needs to prepare to fall back to the second network, to ensure the normal operation of the voice call service through the voice call solution carried by the second network. Optionally, as shown in FIG. 5, the voice call method provided in the embodiment of the present application may further include step 113, step 114 and step 115 after step 111:

Step 113: The UE receives an IMS session rejection message.

In this embodiment of the present application, after the UE sends the second IMS service registration request to the first network instance device, the first network side device may reply the UE with an IMS session rejection message according to circumstances.

Exemplarily, the IMS session rejection message may be a PDU session rejection message. The IMS session rejection message indicates that the IMS PDU session sent by the UE to the first network side device is rejected, and the UE has not successfully registered with the IMS network.

Step 114: The UE starts a first counter.

The first counter is used to record the times of receiving the IMS session rejection messages.

In this embodiment of the present application, after the UE receives the IMS session rejection message each time, the value of the first counter is increased by 1 to record the number of times the UE fails to register the IMS service to the first network side device.

Exemplarily, the first counter is PDU_Session_count, and when receiving the IMS session rejection message for the first time, PDU_Session_count=1. Subsequently, the UE updates the value of the PDU_Session_count after receiving the IMS session rejection message each time.

Step 115: The UE sends a second IMS service registration request to the first network side device through an uplink radio (UR) link.

In this embodiment of the present application, after the UE receives the IMS session rejection message each time, the UE may send the second IMS service registration request to the first network side device again. This is to avoid that because IMS registration failure is caused by one data transmission or a few data transmissions or other factors, the UE gives up the registration of the IMS service that may have been successfully registered.

It can be understood that the UE is also not suitable for sending the second IMS service registration request to the first network side device for an unlimited number of times, when the value recorded by the first counter reaches the first preset threshold or the second timer expires and is turned off, the UE confirms that registration of the IMS service to the first network side device fails. The UE stops sending the second IMS service registration request to the first network side device.

For example, the first preset threshold can be set according to actual needs. The UE may determine the first preset threshold according to the current network data transmission and the capability of a user equipment.

Exemplarily, the first preset threshold may be set to 5.

Optionally, as shown in FIG. 5, the voice call method provided in the embodiment of the present application may further include step 116 and step 117 after step 111:

Step 116: If the UE does not receive, after the first preset duration, the session accept message sent by the first network side device, the UE starts a second counter.

In the embodiment of the present application, after the UE sends the second IMS service registration request to the first network side device through the UR link, after the first preset duration, if the UE has not received the PDU session accept replied by the first network device, the UE starts the second counter.

It can be understood that after the UE fails to receive the session accept message every first preset duration, the value of the first counter is increased by 1 to record the number of times the second IMS service registration request sent by the UE has not received a response from the first network side device.

Optionally, the first preset duration may be 16 seconds.

Exemplarily, the second counter is PDU_Session_timeout_count, and PDU_Session_count+1 when the UE fails to receive the session accept message every first preset duration.

Step 117: When the value of the second counter exceeds the second preset threshold, the UE turns off the second timer.

Exemplarily, when PDU_Session_timeout_count≥2, the second timer (NR_IMS_REG_Timer) is turned off.

It can be understood that when the value of the second counter is greater than or equal to the second preset threshold (n), that is, when the UE has not received the session accept message from the first network side device after waiting n first preset durations, the UE confirms that the registration of the IMS service to the first network side device fails, so that the second timer is turned off, and there is no need to monitor the registration status of the UE.

In this way, when the UE has not received a response from the first network side device after sending the second IMS service registration request to the first network side device for a number of times, that is, the second preset threshold, the UE confirms that registration of the IMS service to the first network side device fails, and the UE stops sending the second IMS service registration request to the first network side device and turns off the second timer and prepares to fall back to the second network, so as to guarantee normal operation of the voice call service through the voice call solution carried on the second network.

Optionally, as shown in FIG. 5, the voice call method provided in the embodiment of the present application further includes step 118 and step 119 after step 111:

Step 118: The UE receives the session accept message sent by the first network side device.

In this embodiment of the present application, the second IMS service registration request (IMS PDU session) sent by the UE to the first network side device is successfully established, and the first network side device also sends a session accept message (PDU session accept) to the UE.

Step 119: If the session accept message carries an IMS registration exception message, determine that the UE has not received the IMS registration success message.

Understandably, since the session accept message (PDU session accept) carries registration exception information, the registration exception information may be SIP signaling registration failure, error information, and the like.

Optionally, after the IMS registration exception message is carried in the session accept message received by the UE, the registration status of the IMS service may be confirmed again after the second timer expires. If the IMS registration is still not successful, the UE confirms that it no longer receives the IMS service registration success message, that is, the UE confirms that the registration of the IMS service to the first network side device fails.

In this way, after the UE sends the second IMS service registration request to the first network side device, although the UE receives the session accept message sent by the first network side device, since the session accept message carries an IMS registration exception message, the UE confirms that the IMS service has not yet been successfully registered, that is, it is impossible to receive the IMS service registration success message, and the UE prepares to fall back to the second network, so as to ensure the normal operation of the voice call service through the voice call solution carried by the second network.

It should be noted that, the voice call method provided in the embodiment of the present application may be executed by a voice call apparatus, or a control module in the voice call apparatus for executing the voice call method. In the embodiment of the present application, the voice call apparatus provided in the embodiment of the present application is described by taking the voice call apparatus executing the voice call method as an example.

Figure 6:
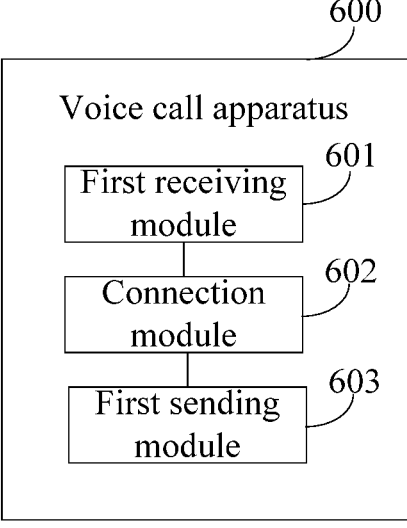
FIG. 6 is a schematic structural diagram of a voice call apparatus according to an embodiment of the present application.

As shown in FIG. 6, the embodiment of the present application provides a voice call apparatus 600. The voice call apparatus includes a first receiving module 601, a connecting module 602, and a first sending module 603.

The first receiving module 601 may be configured to: in a case that UE accesses a first network, receive a registration reception message sent by a first network side device corresponding to a first network. The connection module 602 may be configured to: based on the registration reception message received by the first receiving module 601, in a case that a predetermined condition is met, stop using the first network and connect to a second network. The first sending module 603 may be configured to send a voice call request to a second network side device corresponding to the second network, where the voice call request is used to request the second network side device to process a voice call service. The predetermined condition includes any one of the following: that the registration accept message carries a first identifier used to indicate that the UE does not support an IMS service; and that the registration accept message carries a second identifier used to indicate that the UE supports an IMS service, and the UE confirms that registration of the IMS service to the first network side device fails.

Optionally, the voice call apparatus 600 further includes: a first timing module 604. The first timing module 604 can be configured to start a first timer to start timing; the connection module 602 can further be configured to stop using the second network and connect to the first network after the first timer is turned off.

Optionally, the voice call apparatus 600 further includes: a second sending module 606, a second receiving module 607 and a third sending module 608. The second sending module 606 may be configured to initiate an attach request to the second network side device corresponding to the second network. The second receiving module 607 may be configured to receive an attach accept message sent by the second network side device. The third sending module 608 may be configured to send the first IMS service registration request to the second network side device based on the third identifier carried in the attach accept message or based on that the UE has activated the IMS service; where the third identifier is used to indicate that the UE supports the IMS service.

Optionally, the first sending module 603 may further be configured to send a voice call request to the second network in a case that receiving the IMS registration failure message, where the voice call request is used to request the second network side device to process the voice call service through the CSFB technology; and the third identifier is used to indicate that the UE does not support the IMS service.

Optionally, the first sending module 603 may further be configured to send a voice call request to the second network in a case that the IMS registration success message is received, where the voice call request is used to request the second network side device to process the voice call service through the IMS service.

Optionally, the voice call apparatus 600 further includes: a prompt module 609 and a fifth sending module 610. The prompt module 609 can be configured to prompt a user to obtain the permission to activate the IMS service; the fifth sending module 610 can be configured to edit and send a first message to the second network side device in response to an input of a user for confirming the activation of IMS permission, where the first message is used to request the second network side device to activate the IMS service.

Optionally, the voice call apparatus 600 further includes: a fourth sending module 611, a second timing starting module 612 and a processing module 613. The fourth sending module 611 may be configured to send a second IMS service registration request to the first network side device through the NR link; the second timing starting module 612 may be configured to start a second timer to start timing; the processing module 613 may be configured to: based on that the second timer expires or is turned off, or based on that the UE does not receive the IMS registration success message, confirm that the registration of the IMS service to the first network side device fails.

Optionally, the voice call apparatus 600 further includes: a third receiving module 614 and a counting module 615. The third receiving module 614 can be configured to receive the IMS session rejection message; the counting module 615 is configured to start the first counter, where the first counter is used to record the number of times the IMS session rejection message is received; the fourth sending module 611 can further be configured to send a second IMS service registration request to the first network side device through the UR link until the value recorded by the first counter reaches the first preset threshold or the second timer expires.

Optionally, the voice call apparatus 600 further includes: a second counting module 616 and a timing disabling module 605. The second counting module 616 can be configured to start the second counting module if the UE does not receive the session accept message sent by the first network side device after the first preset duration; the timing disabling module 605 can further be configured to: when the value of the counter exceeds the second preset threshold, turn off the second timer.

Optionally, the voice call apparatus 600 further includes: a fourth receiving module 617. The fourth receiving module 617 may be configured to receive a session accept message sent by the first network side device; the processing module 613 may further be configured to: if the session accept message carries an IMS registration exception message, determine that the UE has not received an IMS registration success message.

In the embodiment of the present application, when the UE accesses the first network (for example: a 5G SA network), the voice call apparatus receives the registration reception message sent by the first network side device corresponding to the first network; when the predetermined condition is met, the voice call apparatus stops using the first network and accesses the second network (for example: an LTE network). The voice call apparatus sends a voice call request to the second network side device corresponding to the second network, where the voice call request is used to request the second network side device to process the voice call service, and the predetermined condition includes any one of the following: that the registration reception message carries a first identifier used to indicate that the UE does not support an IMS service; and that the registration reception message carries a second identifier used to indicate that the UE supports an IMS service, and the voice call apparatus confirms that registration of the IMS service to the first network side device fails. In this way, when a user equipment is in the 5G SA network, in a case that the UE fails to register with the IMS network or the UE has not activated or the UE does not support the IMS service, the UE can process a user voice call request by requesting other voice solutions under the LTE network, which can ensure that the UE can perform voice calls with other UEs, meet a user call needs, and guarantee a user call experience.

The voice call apparatus in the embodiments of the present application may be an apparatus, or may be a component, an integrated circuit, or a chip in a terminal. The apparatus may be mobile user equipment or non-mobile user equipment. For example, the mobile user equipment may be a mobile phone, a tablet computer, a laptop computer, a palmtop computer, an in-vehicle user equipment, a wearable device, an ultra-mobile personal computer (UMPC), a net-book, or a personal digital assistant (PDA). The non-mobile user equipment may be a server, a network attached storage (NAS), a personal computer (PC), a television (TV), an automated teller machine or a self-service machine. This is not limited in the embodiments of the present application.

The voice call apparatus in the embodiments of the present application may be an apparatus with an operating system. The operating system may be an Android operating system, an iOS operating system, or another possible operating system, which is not limited in the embodiments of the present application.

The voice call apparatus provided in this embodiment of the present application can implement processes implemented by the payment interface display apparatus in the method embodiments of FIG. 1 to FIG. 5. To avoid repetition, details are not described herein again.

Figure 7:
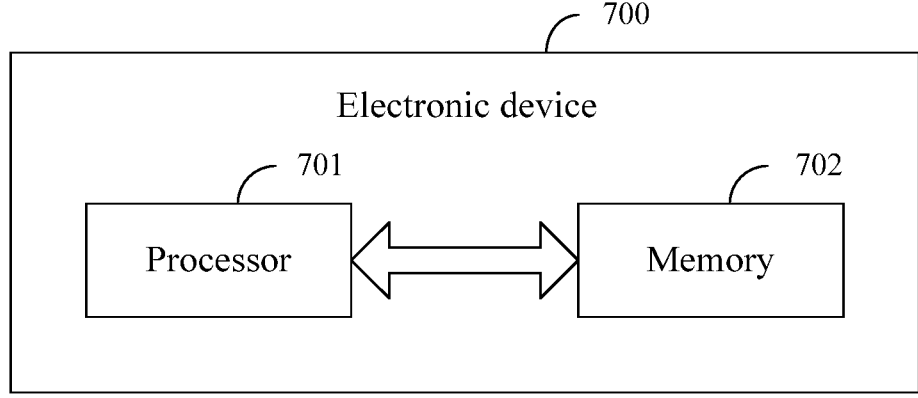
FIG. 7 is a structural schematic diagram 1 of user equipment according to an embodiment of the present application.

Optionally, as shown in FIG. 7, the embodiments of the present application further provide a user equipment 700, including a processor 701, a memory 702, and a program or an instruction stored in the memory 702 and executable on the processor 701, When the program or instruction is executed by the processor 701, each process of the voice call method embodiment described above can be realized, and the same technical effect can be achieved. To avoid repetition, details are not repeated herein.

It should be noted that a user equipment in this embodiment of the present application includes the above-mentioned mobile user equipment and non-mobile user equipment.

Figure 8:
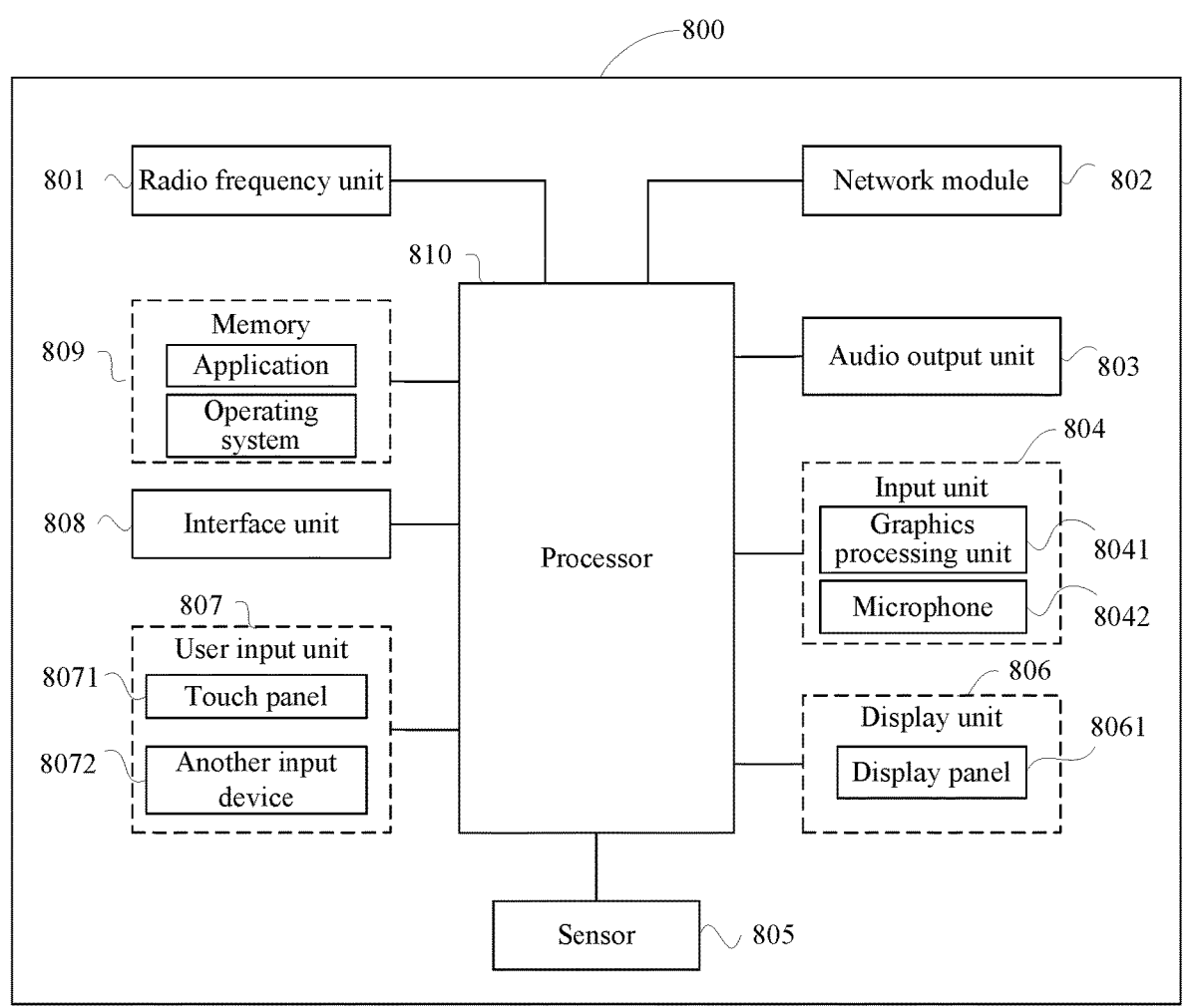
FIG. 8 is a structural schematic diagram 2 of user equipment according to an embodiment of the present application.

FIG. 8 is a schematic diagram of a hardware structure of user equipment according to an embodiment of the present application.

A user equipment 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

A person skilled in the art can understand that a user equipment 800 may further include a power supply (for example, a battery) that supplies power to the components. The power supply may be logically connected to the processor 810 by using a power management system, so as to implement functions such as charging management, discharging management, and power consumption management by using the power management system. A user equipment is not limited to a user equipment structure shown in FIG. 8. A user equipment may include more or fewer components than those shown in the figure, or combine some components, or have a different component arrangement. Details are not described herein.

The processor 810 is configured to: in a case that user equipment UE accesses a first network, receive a registration reception message sent by a first network side device corresponding to a first network; based on the registration reception message received by the first receiving module 801, in a case that a predetermined condition is met, stop using the first network and connect to a second network; and send a voice call request to a second network side device corresponding to the second network, where the voice call request is used to request the second network side device to process a voice call service. The predetermined condition includes any one of the following: that the registration accept message carries a first identifier used to indicate that the UE does not support an IMS service; and that the registration accept message carries a second identifier used to indicate that the UE supports an IMS service, and the UE confirms that registration of the IMS service to the first network side device fails.

Optionally, the processor 810 can further be configured to start a first timer to start timing; and stop using the connection of the second network and connect to the first network after the first timer is turned off.

Optionally, the processor 810 may further be configured to initiate an attach request to the second network side device corresponding to the second network; receive an attach accept message sent by the second network side device; and send the first IMS service registration request to the second network side device based on the third identifier carried in the attach accept message or based on that the UE has activated the IMS service; where the third identifier is used to indicate that the UE supports the IMS service.

Optionally, the processor 810 may further be configured to send a voice call request to the second network in a case that the IMS registration failure message is received, where the voice call request is used to request the second network side device to process the voice call service through the CSFB technology.

Optionally, the processor 810 may further be configured to send a voice call request to the second network in a case that the IMS registration success message is received, where the voice call request is used to request the second network side device to process the voice call service through the IMS service.

Optionally, the processor 810 can further be configured to prompt a user to obtain the permission to activate the IMS service; the fifth can be configured to edit and send a first message to the second network side device in response to an input of a user for confirming the activation of IMS permission, where the first message is used to request the second network side device to activate the IMS service.

Optionally, the processor 810 may further be configured to send a second IMS service registration request to the first network side device through the NR link; start a second timer to start timing; based on that the second timer expires or is turned off, or based on that a user equipment UE does not receive the registration success message, confirm that the registration of the IMS service to the first network side device fails.

Optionally, the processor 810 may further be configured to receive an IMS session rejection message; start a first counter, and the first counter is used to record the number of times the IMS session rejection message is received.

Optionally, the processor 810 may further be configured to send the second IMS service registration request to the first network side device again through the UR link, until the value recorded by the first counter reaches the first preset threshold or the second timer expires.

Optionally, the processor 810 may further be configured to start a second counter if the UE does not receive, after the first preset duration, the session accept message sent by the first network side device; when the value of the second counter exceeds the second preset threshold, turn off the second timer.

Optionally, the processor 810 may further be configured to receive a session accept message sent by the first network side device; if the session accept message carries an IMS registration exception message, determine that the UE has not received the registration success message.

In the embodiment of the present application, when a user equipment UE accesses the first network (for example: a 5G SA network), the UE receives the registration reception message sent by the first network side device corresponding to the first network; when the predetermined condition is met, the UE stops using the first network and accesses the second network (for example: an LTE network). The UE sends a voice call request to the second network side device corresponding to the second network, where the voice call request is used to request the second network side device to process the voice call service, and the predetermined condition includes any one of the following: that the registration reception message carries a first identifier used to indicate that the UE does not support an IMS service; and that the registration reception message carries a second identifier used to indicate that the UE supports an IMS service, and the UE confirms that registration of the IMS service to the first network side device fails. In this way, when a user equipment is in the first network, in a case that the UE fails to register with the IMS network or the UE has not activated or the UE does not support the IMS service, the UE can process a user voice call request by requesting other voice solutions under the LTE network, which can ensure that the UE can perform voice calls with other UEs, meet a user call needs, and guarantee a user call experience.

It should be understood that, in this embodiment of the present application, the input unit 804 may include a graphics processing unit (GPU) 8041 and a microphone 8042. The graphics processing unit 8041 processes image data of a static picture or a video obtained by an image capture apparatus (such as a camera) in a video capture mode or an image capture mode. The display unit 806 may include a display panel 8061. Optionally, the display panel 8061 may be configured in a form such as a liquid crystal display or an organic light-emitting diode. A user input unit 807 includes a touch panel 8071 and another input device 8072. The touch panel 8071 is also called a touch screen. The touch panel 8071 may include two parts: a touch detection apparatus and a touch controller. The another input device 8072 may include but is not limited to a physical keyboard, a functional button (such as a volume control button or a power on/off button), a trackball, a mouse, and a joystick. Details are not described herein. The memory 809 may be configured to store a software program and various data, including but not limited to an application and an operating system. An application processor and a modem processor may be integrated into the processor 810, the application processor mainly processes an operating system, a user interface, an application, and the like, and the modem processor mainly processes wireless communication. It can be understood that, alternatively, the modem processor may not be integrated into the processor 810.

An embodiment of the present application further provides a non-transitory readable storage medium. The non-transitory readable storage medium stores a program or an instruction, and when the program or the instruction is executed by a processor, the various processes of the foregoing voice call method embodiment are performed and the same technical effects can be achieved. To avoid repetition, details are not described herein again.

The processor is the processor in a user equipment in the foregoing embodiments. The non-transitory readable storage medium includes a non-transitory computer-readable storage medium, such as a computer read-only memory (ROM), a random access memory (RAM), a magnetic disk, or an optical disc.

An embodiment of the present application further provides a chip, the chip includes a processor and a communication interface, the communication interface is coupled to the processor, and the processor is configured to run programs or instructions to implement each process of the embodiment of the foregoing voice call method and the same technical effects can be achieved. To avoid repetition, details are not described herein again.

It should be understood that the chip mentioned in this embodiment of the present application may also be referred to as a system-level chip, a system chip, a chip system, or an on-chip system chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be pointed out that the scope of the methods and devices in the embodiments of the present application is not limited to performing functions in the order shown or discussed, and may also include performing functions in a substantially simultaneous manner or in a reverse order according to the functions involved, for example, the described methods may be performed in an order different from that described, and various steps may also be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of the present application essentially, or the part contributing to the prior art may be implemented in a form of a computer software product. The computer software product is stored in a storage medium (for example, a ROM/RAM, a magnetic disk, or a compact disc), and includes a plurality of instructions for instructing a terminal (which may be a mobile phone, a computer, a server, a network device, or the like) to perform the method described in the embodiments of the present application.

The embodiments of the present application are described above with reference to the accompanying drawings, but the present application is not limited to the above implementations, and the above implementations are only illustrative and not restrictive. Under the enlightenment of the present application, those of ordinary skill in the art can make many forms without departing from the purpose of the present application and the protection scope of the claims, all of which fall within the protection of the present application.

What is claimed is:

1. A voice call method, comprising:

in response to a user equipment (UE) accessing a first network, receiving, by the UE, a registration reception message sent by a first network side device corresponding to a first network;

based on the registration reception message, after a predetermined condition is met, stopping, by the UE, using the first network, and connecting to a second network; and sending, by the UE, a voice call request to a second network side device corresponding to the second network, wherein the voice call request is used to request the second network side device to process a voice call service;

wherein the predetermined condition comprises:

that the registration reception message carries a second identifier used to indicate that the UE supports an internet protocol multimedia subsystem (IMS) service, and the UE confirms that registration of the IMS service to the first network side device fails;

wherein before the stopping, by the UE, using the first network and connecting to the second network, the method further comprises:

sending, by the UE, a second IMS service registration request to the first network side device through a new radio (NR) link, and starting a second timer to start timing; and based on that the second timer expires or is turned off, or based on that the UE does not receive an IMS registration success message, confirming, by the UE, that the registration of the IMS service to the first network side device fails;

wherein after the starting, by the UE, the second timer to start timing, the method further comprises:

if the UE does not receive, after a first preset duration, a session accept message sent by the first network side device, starting, by the UE, a second counter; and when a value of the second counter exceeds a second preset threshold, turning off, by the UE, the second timer.

2. The method according to claim 1, wherein after the stopping, by the UE, using the first network and connecting to the second network, the method further comprises:

starting, by the UE, a first timer to start timing; and after the first timer is turned off, stopping, by the UE, using the second network, and connecting to the first network.

3. The method according to claim 1, wherein after the starting, by the UE, the second timer to start timing, the method further comprises:

receiving, by the UE, an IMS session rejection message;

starting, by the UE, a first counter, wherein the first counter is used to record a number of times the IMS session rejection message is received; and sending, by the UE, the second IMS service registration request to the first network side device through an uplink radio (UR) link, until a value recorded by the first counter reaches a first preset threshold or the second timer expires.

4. The method according to claim 1, wherein after the starting, by the UE, the second timer to start timing, the method further comprises:

receiving, by the UE, a session accept message sent by the first network side device; and if the session accept message carries an IMS registration exception message, determining, by the UE, that the UE has not received the IMS registration success message.

5. A user equipment (UE), comprising a processor, a memory, and a program or an instruction stored in the memory and executable on the processor, wherein the program or the instruction, when executed by the processor, causes the UE to perform:

in response to the UE accessing a first network, receiving a registration reception message sent by a first network side device corresponding to a first network;

based on the registration reception message, after a predetermined condition is met, stopping using the first network, and connecting to a second network; and sending a voice call request to a second network side device corresponding to the second network, wherein the voice call request is used to request the second network side device to process a voice call service;

wherein the predetermined condition comprises:

that the registration reception message carries a second identifier used to indicate that the UE supports an internet protocol multimedia subsystem (IMS) service, and the UE confirms that registration of the IMS service to the first network side device fails;

wherein the program or the instruction, when executed by the processor, causes the UE to further perform:

sending a second IMS service registration request to the first network side device through a new radio (NR) link, and starting a second timer to start timing; and based on that the second timer expires or is turned off, or based on that the UE does not receive an IMS registration success message, confirming that the registration of the IMS service to the first network side device fails;

wherein the program or the instruction, when executed by the processor, causes the UE to further perform:

if the UE does not receive, after a first preset duration, a session accept message sent by the first network side device, starting a second counter; and when a value of the second counter exceeds a second preset threshold, turning off the second timer.

6. The UE according to claim 5, wherein the program or the instruction, when executed by the processor, causes the UE to further perform:

starting a first timer to start timing; and after the first timer is turned off, stopping using the second network, and connecting to the first network.

7. The UE according to claim 5, wherein the program or the instruction, when executed by the processor, causes the UE to further perform:

receiving an IMS session rejection message;

starting a first counter, wherein the first counter is used to record a number of times the IMS session rejection message is received; and sending the second IMS service registration request to the first network side device through an uplink radio (UR) link, until a value recorded by the first counter reaches a first preset threshold or the second timer expires.

8. The UE according to claim 5, wherein the program or the instruction, when executed by the processor, causes the UE to further perform:

receiving a session accept message sent by the first network side device; and if the session accept message carries an IMS registration exception message, determining that the UE has not received the IMS registration success message.

9. A non-transitory readable storage medium, in which a program or an instruction is stored, wherein the program or the instruction, when executed by a processor of a user equipment (UE), causes the UE to perform:

in response to the UE accessing a first network, receiving a registration reception message sent by a first network side device corresponding to a first network;

based on the registration reception message, after a predetermined condition is met, stopping using the first network, and connecting to a second network; and sending a voice call request to a second network side device corresponding to the second network, wherein the voice call request is used to request the second network side device to process a voice call service;

wherein the predetermined condition comprises:

that the registration reception message carries a second identifier used to indicate that the UE supports an internet protocol multimedia subsystem (IMS) service, and the UE confirms that registration of the IMS service to the first network side device fails;

wherein the program or the instruction, when executed by the processor, causes the UE to further perform:

sending a second IMS service registration request to the first network side device through a new radio (NR) link, and starting a second timer to start timing; and based on that the second timer expires or is turned off, or based on that the UE does not receive an IMS registration success message, confirming that the registration of the IMS service to the first network side device fails;

wherein the program or the instruction, when executed by the processor, causes the UE to further perform:

if the UE does not receive, after a first preset duration, a session accept message sent by the first network side device, starting a second counter; and when a value of the second counter exceeds a second preset threshold, turning off the second timer.

10. The non-transitory readable storage medium according to claim 9, wherein the program or the instruction, when executed by the processor, causes the UE to further perform:

starting a first timer to start timing; and after the first timer is turned off, stopping using the second network, and connecting to the first network.

11. The non-transitory readable storage medium according to claim 9, wherein the program or the instruction, when executed by the processor, causes the UE to further perform:

receiving an IMS session rejection message;

starting a first counter, wherein the first counter is used to record a number of times the IMS session rejection message is received; and sending the second IMS service registration request to the first network side device through an uplink radio (UR) link, until a value recorded by the first counter reaches a first preset threshold or the second timer expires.

12. The non-transitory readable storage medium according to claim 9, wherein the program or the instruction, when executed by the processor, causes the UE to further perform:

receiving a session accept message sent by the first network side device; and if the session accept message carries an IMS registration exception message, determining that the UE has not received the IMS registration success message.

* * * * *